(12) United States Patent
Mitarai et al.

(10) Patent No.: US 7,963,036 B2
(45) Date of Patent: Jun. 21, 2011

(54) METHOD OF MANUFACTURING BEARING DEVICE FOR VEHICLE

(75) Inventors: Tadashi Mitarai, Osaka (JP); Shunji Morimoto, Osaka (JP)

(73) Assignee: JTEKT Corporation, Osaka (JP)

( * ) Notice: Subject to any disclaimer, the term of this patent is extended or adjusted under 35 U.S.C. 154(b) by 1157 days.

(21) Appl. No.: 10/590,266

(22) PCT Filed: Feb. 22, 2005

(86) PCT No.: PCT/JP2005/002776
§ 371 (c)(1),
(2), (4) Date: Nov. 29, 2006

(87) PCT Pub. No.: WO2005/080033
PCT Pub. Date: Sep. 1, 2005

(65) Prior Publication Data
US 2007/0193031 A1    Aug. 23, 2007

(30) Foreign Application Priority Data
Feb. 23, 2004  (JP) ................... P2004-046946

(51) Int. Cl.
B21D 53/26    (2006.01)
B21K 1/40    (2006.01)

(52) U.S. Cl. ............... 29/894.362; 29/894.36; 82/1.11; 82/104; 82/112; 301/105.1

(58) Field of Classification Search ............ 29/899.362, 29/898.09, 894.362, 894.36; 82/1.11, 112, 82/104, 129, 163; 301/105.1
See application file for complete search history.

(56) References Cited

U.S. PATENT DOCUMENTS
5,842,388 A * 12/1998 Visser et al. ............. 82/1.11

FOREIGN PATENT DOCUMENTS
| JP | 61-236441 | 10/1986 |
| JP | 3-29239 | 2/1991 |
| JP | 2000-117504 | 4/2000 |
| JP | 2001-315503 | 11/2001 |
| JP | 2002-370104 | 12/2002 |

* cited by examiner

Primary Examiner — Rick K Chang
(74) Attorney, Agent, or Firm — Jordan and Hamburg LLP

(57) ABSTRACT

An outer ring of a bearing device for a vehicle has a cylindrical main body extending from an inner vehicle side to an axially opposite side. The main body has a raceway at an inner peripheral surface. A flange is provided at an outer peripheral surface of the outer ring toward the ring's vehicle inner side end. A cylindrical fitting tolerance part also is provided at the outer peripheral surface of the outer ring, at a position closer to the vehicle inner side end than the flange. The axial length of the cylindrical fitting tolerance part may be designed to be any of various lengths. The bearing device is manufactured by turning the cylindrical main body while holding the flange, such as for embodiments in which the cylindrical fitting tolerance part has a short length unsuitable for holding.

9 Claims, 7 Drawing Sheets

F I G. 3
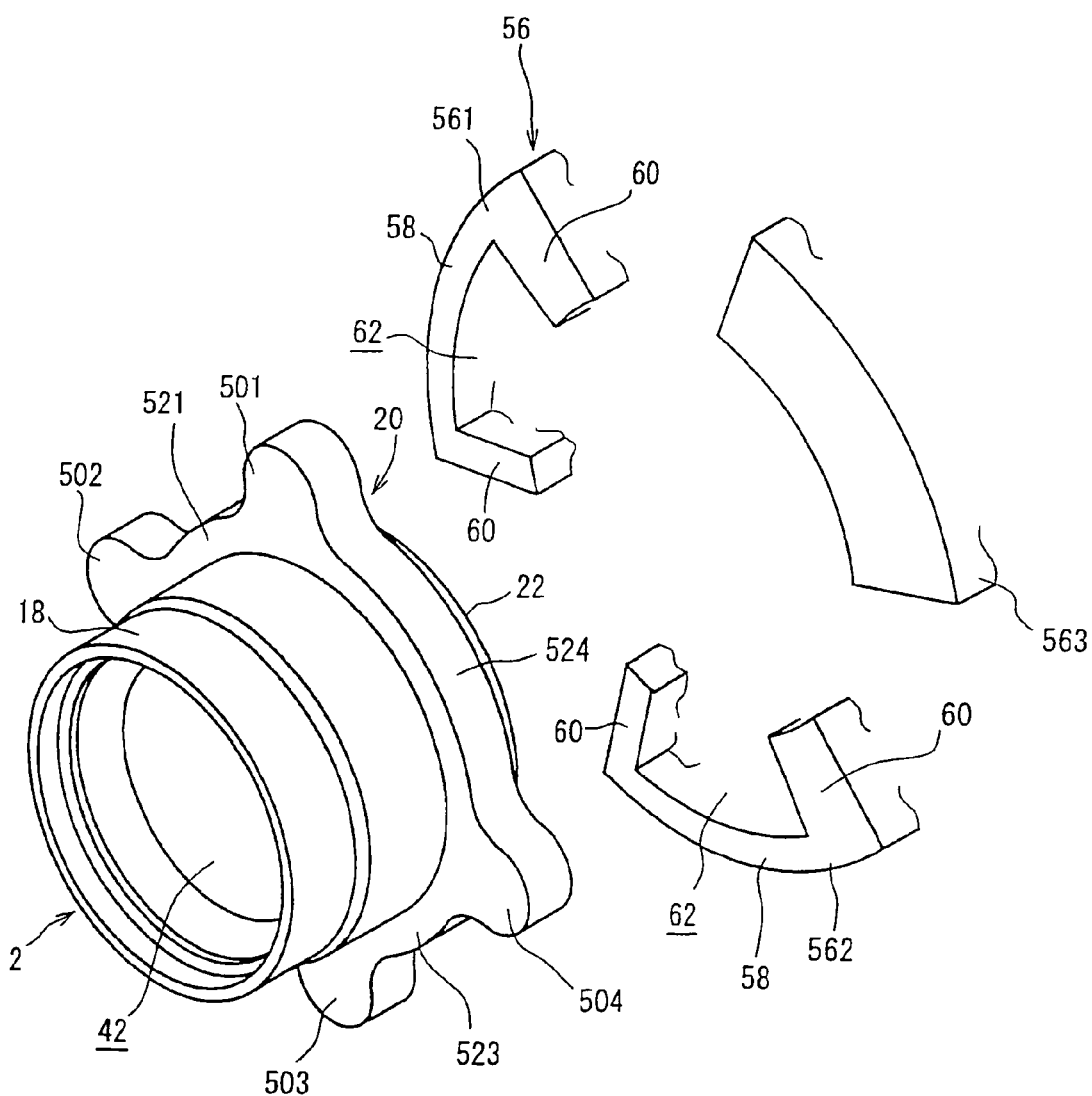

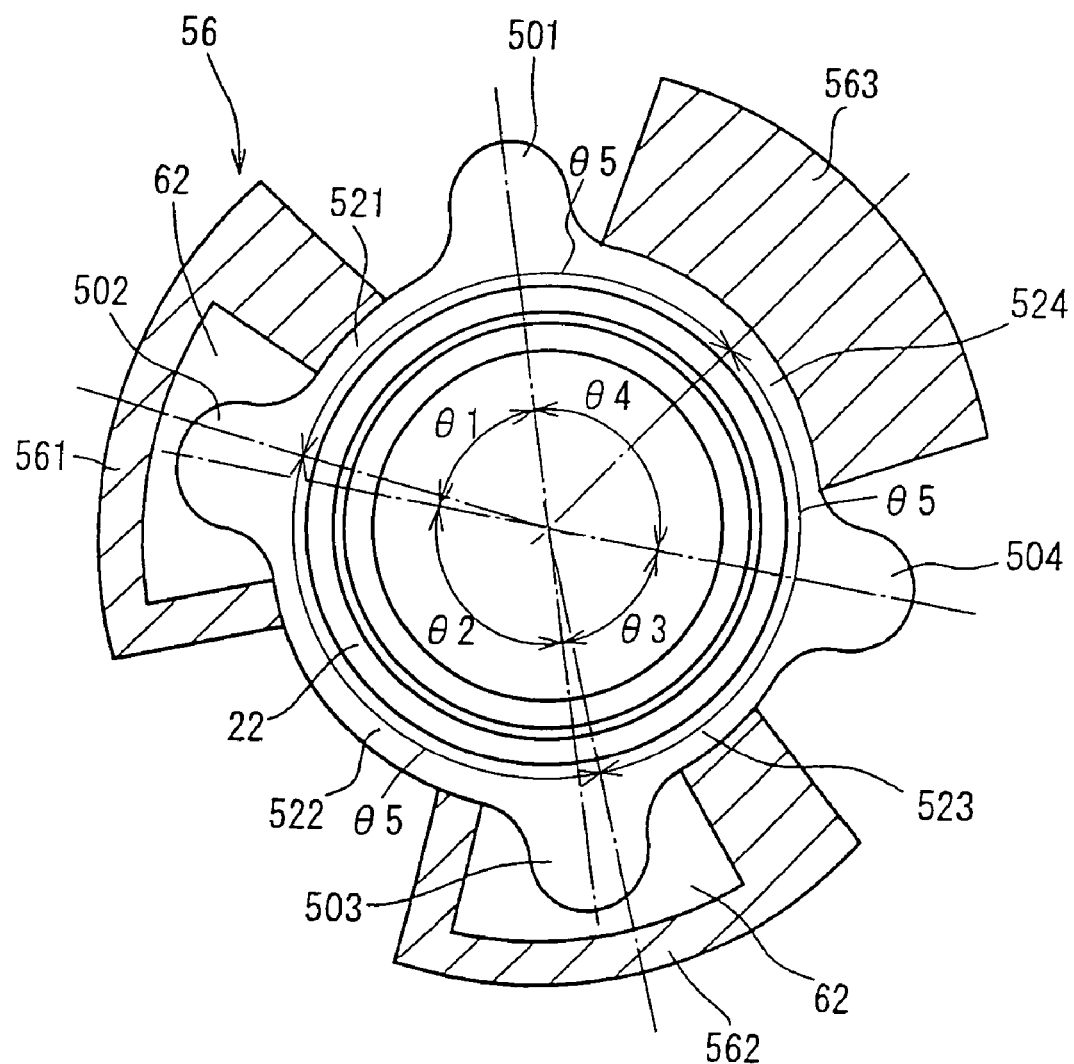
F I G. 4

METHOD OF MANUFACTURING BEARING DEVICE FOR VEHICLE

FIELD OF THE INVENTION

The present invention relates to improvements of a manufacturing process for an outer ring comprising a flange in an outer peripheral surface of a cylindrical main body on a vehicle inner side and a cylindrical fitting tolerance part further on the vehicle inner side than the flange a in method of manufacturing a bearing device for vehicle.

BACKGROUND OF THE INVENTION

An outer ring used in a bearing device for vehicle (hub unit) generally comprises a cylindrical main body comprising raceways in double rows in an inner peripheral surface thereof, a flange provided in an outer peripheral surface of the cylindrical main body, and a cylindrical fitting tolerance part on a vehicle inner side in comparison to the flange (see the Patent Document 1).

A knuckle is assembled to a side surface of the flange of the outer ring on the vehicle inner side and an outer peripheral surface of the cylindrical fitting tolerance part, and the outer ring is thereby assembled under irrotational state on a vehicle side. In the bearing device for vehicle thus constituted, it is necessary for the side surface of the flange on vehicle-inner-side and the outer peripheral surface of the cylindrical fitting tolerance part to be made finish machining with a required high precision.

A conventional method of manufacturing the bearing device for vehicle comprises a step of grinding the outer peripheral surface and inner peripheral surface of the cylindrical main body by holding the cylindrical fitting tolerance part of the outer ring using a holding device, a step of grinding the cylindrical fitting tolerance part by holding the outer peripheral surface of the cylindrical main body, a step of heat-processing the inner peripheral surface of the cylindrical main body and raceways, and a step of turning the cylindrical fitting tolerance part by holding the cylindrical main body as a finishing process.

Patent Document 1: No. 2001-315503 of the Japanese Patent Applications Laid-Open

DISCLOSURE OF THE INVENTION

Problem to be Solved by the Invention

An axial length of the cylindrical fitting tolerance part of the outer ring can be set at various values in design. The axial length of the cylindrical fitting tolerance part thus selected may not be long enough for the holding device to hold the cylindrical fitting tolerance part with a sufficient holding force. In that case, it becomes difficult for the holding device to reliably hold the cylindrical fitting tolerance part, which generates a problem in a process for turning to the outer peripheral surface and the inner outer peripheral surface of the cylindrical main body.

Means for Solving the Problem

A method of manufacturing a bearing device for vehicle according to the present invention is a method of manufacturing a bearing device for vehicle whose outer ring comprises a cylindrical main body comprising a raceway in an inner peripheral surface thereof, a flange provided in an outer peripheral surface of the cylindrical main body on a vehicle inner side, and a cylindrical fitting tolerance part provided further on the vehicle inner side than the flange, wherein a step of turning the cylindrical main body in a state where the flange is held by a holding device is included.

According to the present invention, the cylindrical main body is turned holding the flange by the holding device. Therefore, an outer peripheral surface of the cylindrical main body can be turned even if an axial length of the cylindrical fitting tolerance part is not long enough for the holding device to hold the cylindrical fitting tolerance part. The turning of the cylindrical main body is not limited to the outer peripheral surface thereof, and also applied to the other parts such as the inner peripheral surface thereof.

In the present invention, it is preferable to include a step of heat-processing the raceway of the cylindrical main body, and a step of turning a side surface of the flange on the vehicle inner side in which the raceway is heat-processed and an outer peripheral surface of the cylindrical fitting tolerance part as a finishing process before the before-mentioned step.

In the turning step as the finishing process, it is preferable that the vehicle-inner-side side surface and the outer peripheral surface of the cylindrical fitting tolerance part are finished by turning on the basis of the outer peripheral surface of the cylindrical main body which is already turned after the outer peripheral surface of the cylindrical main body is held.

EFFECT OF THE INVENTION

According to the present invention, the cylindrical main body can be turned in such a manner that the flange of the outer ring is held by the holding device even in the bearing device for vehicle comprising the outer ring in which the cylindrical fitting tolerance part is axially short.

BRIEF DESCRIPTION OF THE DRAWINGS

FIG. 3 is a perspective view illustrating the flange of the outer ring and a holding device in an outer ring manufacturing process.

FIG. 4 is a front view illustrating the flange of the outer ring and the holding device in the outer ring manufacturing process.

Figure 1:
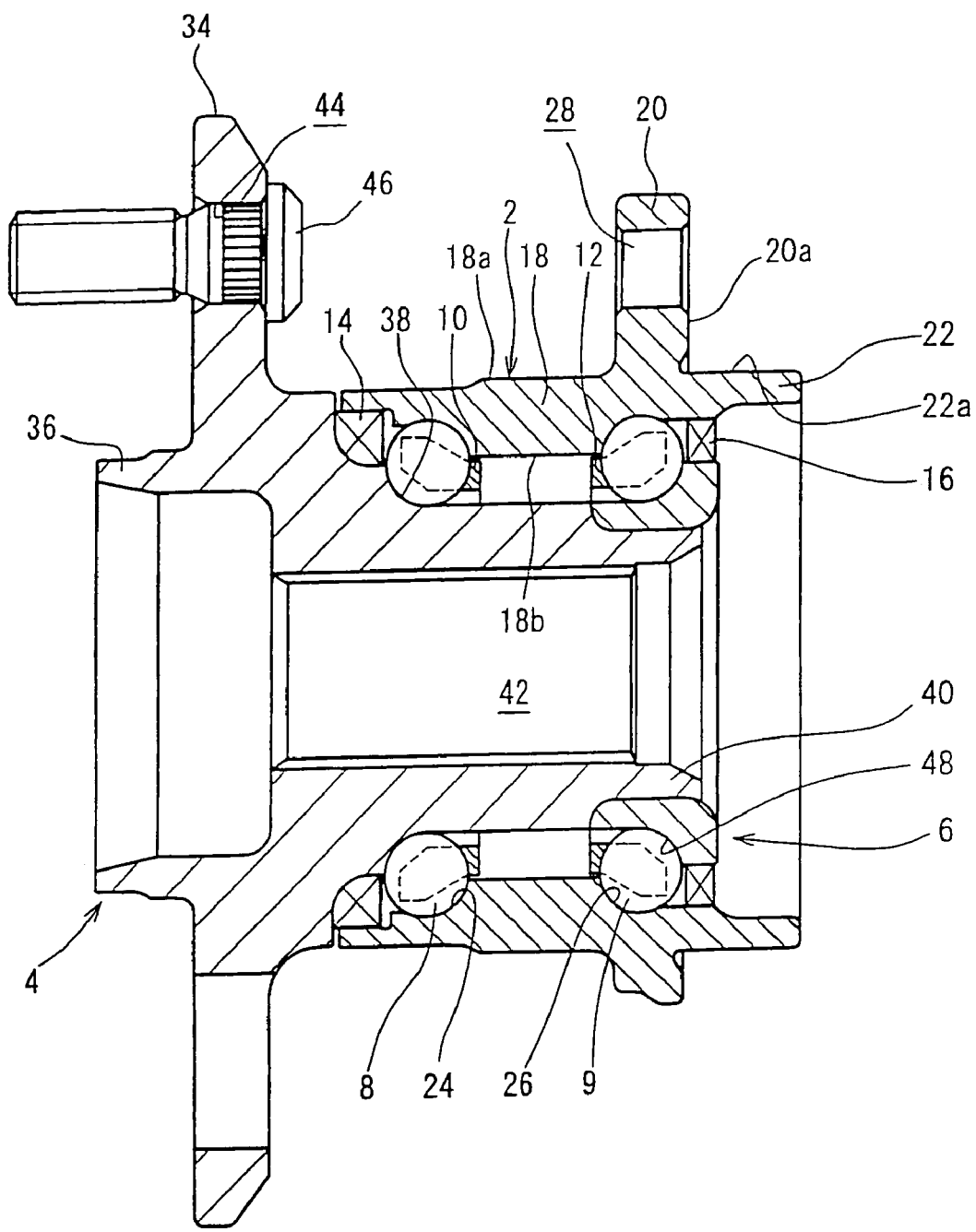
FIG. 1 is a sectional view illustrating an overall structure of a roller bearing according to a preferred embodiment of the present invention.

DESCRIPTION OF REFERENCE SYMBOLS 2 outer ring
4 hub shaft
6 inner ring
8, 9 rolling body
10, 12 retainer
14, 16 seal
18 cylindrical main body
20 flange
22 cylindrical fitting tolerance part
56 holding device

PREFERRED EMBODIMENT OF THE INVENTION

Hereinafter, a structure of a bearing device for vehicle used for description of a manufacturing method according to a preferred embodiment of the present invention is described referring to the drawings. A vehicle inner side of the bearing device is shown on the right side in FIG. 1, while a vehicle outer side is shown on the left side. In the present preferred embodiment, the present invention is applied to a bearing device for vehicle for supporting driving wheels of a vehicle such as an automobile, however, can be applied to any bearing device for vehicle wherein an outer ring is equipped with a cylindrical main body, a fitting tolerance part, and a flange.

The bearing device for vehicle according to the present preferred embodiment has a structure of a double row angular ball bearing. The bearing device for vehicle comprises an outer ring 2, a hub shaft 4, an inner ring 6, rolling bodies 8 and 9 comprising a plurality of balls, retainers 10 and 12, and seals 14 and 16.

The outer ring 2 is formed from a steel member such as carbon steel for mechanical structure (S55C). The outer ring 2 comprises a cylindrical main body 18 and a flange 20 extending radially-outwardly in an outer peripheral surface of the cylindrical main body 18 on the vehicle inner side. A cylindrical fitting tolerance part 22 is provided as extending further on the vehicle inner side than the flange 20 in order to mount a knuckle or the like in the outer ring 2. An axial length of the cylindrical fitting tolerance part 22 can be set to various values in designing. The set-up axial length may be set, in some cases, to such a value that the cylindrical fitting tolerance part 22 cannot be held by the holding device 56 or such a value that the flange is held with a considerable difficulty.

An outer peripheral surface 18a of the cylindrical main body 18 is made turning. Outer ring raceways 24 and 26 are formed on the vehicle inner and outer sides in an inner peripheral surface 18b of the cylindrical main body 18. Bolt hole 28 is formed at a plurality of positions in the flange 20 in a circumferential direction. The knuckle not shown, which is a part of the vehicle, is fitted into an outer peripheral surface of the cylindrical fitting tolerance part 22. The outer ring 2 is fixed to the knuckle via bolts, not shown, inserted through the bolt hole 28 of the flange 20.

A hub shaft 4 comprises a flange 34 for attaching a wheel and a brake disc rotor, which are not shown, extending radially-outwardly in an outer peripheral surface thereof on the vehicle outer side. The hub shaft 4 comprises a fitting tolerance part 36 further on the vehicle outer side than the flange 34. A raceway 38 is formed in the outer peripheral surface of the hub shaft 4 so as to face the raceway 24 which is one of the raceways of the outer ring 2 in a radial direction. The hub shaft 4 is made a cylindrical part 40 having a small diameter on the vehicle inner side, and also a shaft hole 42 spline-fitted to a shaft body such as a constant velocity joint, is provided.

An axially through bolt hole 44 is provided at a plurality of circumferential positions in the flange 34 of the hub shaft 4. A bolt 46 for fixing the wheel and the brake disc rotor is fixedly pressed into each of the bolt hole 44. The inner ring 6 is fitted into the small-diameter cylindrical part 40 of the hub shaft 4. The inner ring 6 has a raceway 48 which faces the raceway 26 of the outer ring 2 in a radial direction. The inner ring 6 is fitted to mount by press-insertion into an outer periphery of the small-diameter cylindrical part 40 of the hub shaft 4. The plurality of rolling bodies 8 and 9 are interposed between the raceways 24 and 26 and between the raceways 38 and 48. The rolling bodies 8 and 9 are retained in the retainers 10 and 12 in such a manner that they freely roll therein. The seals 14 and 16 are provided respectively between the outer ring 2 and the hub shaft 4 and between the outer ring 2 and the inner ring 6 so that annular spaces between the outer ring 2 and the hub shaft 4 and between the outer ring 2 and the inner ring 6 are sealed against the outside. The annular spaces are filled with a lubricating agent such as grease.

Figure 2:
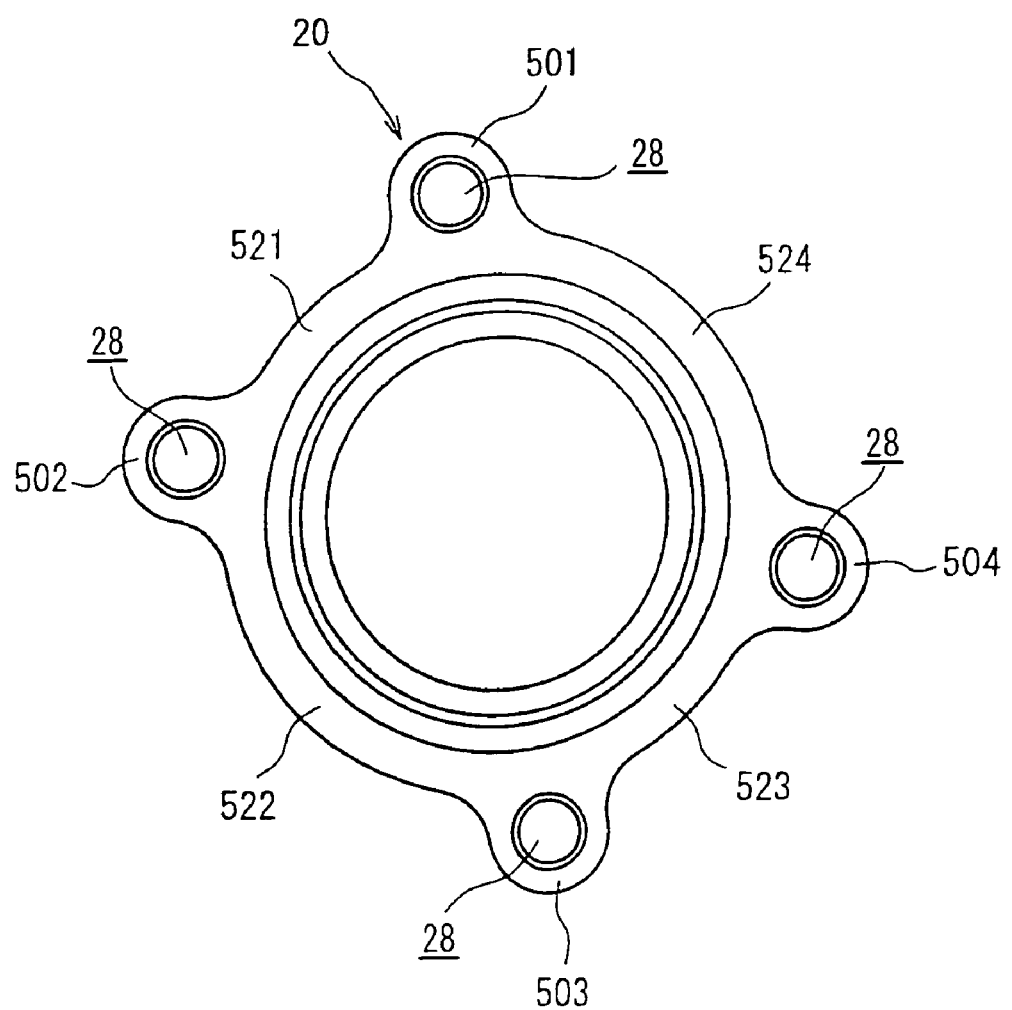
FIG. 2 is a side view of a flange of an outer ring according to the preferred embodiment.

Describing the structure referring to FIG. 2, the flange 20 of the outer ring 2 comprises a plurality of circumferential large-diameter flanges 501-504 and a plurality of circumferential small-diameter flanges 521-524. The large-diameter flanges 501-504 are protruded outwardly in a radial direction from the outer ring 2. The large-diameter flanges 501-504 are provided each other with distance in the circumferential direction of the outer ring 2. The axially through bolt hole 28 is formed in the respective large-diameter flanges 501-504. The small-diameters 521-524 are provided continuously between the respective large-diameter flanges 501-504 in the circumferential direction thereof.

The circumferential distances between the respective large-diameter flanges 501-504 (angles from an axial center $\theta 1$-$\theta 4$) are set as follows based on the large-diameter flange 501 as shown in FIG. 4. Center positions of the large-diameter flanges 501-504 in the circumferential direction are distant from one another by the angle $\theta 1$ (between the large-diameter flanges 501 and 502), the angle $\theta 2$ (between the large-diameter flanges 502 and 503), the angle $\theta 3$ (between the large-diameter flanges 503 and 504), and the angle $\theta 4$ (between the large-diameter flanges 504 and 501). In the example shown in the drawing, it is set to be $\theta 1 = \theta 3$, $\theta 2 = \theta 4$, and $\theta 1$, $\theta 3 \neq \theta 2$, $\theta 4$. The circumferential distances referred to in this specification (angles $\theta 1$-$\theta 4$) means that the circumferential distances (angles $\theta 1$-$\theta 4$) between each of the center positions of the large-diameter flanges 501-504 in the circumferential width, are indicated in terms of angle.

Referring to FIGS. 3 through 6, a method of manufacturing the bearing device for vehicle according to the present preferred embodiment is described. In the present preferred embodiment, a holding device 56 shown in FIGS. 3 and 4 is used. FIG. 3 is a perspective view showing the outer ring 2 and the holding device 56. FIG. 3 shows a state where the holding device 56 does not hold the flange 20 of the outer ring 2. FIG. 4 is a partial sectional view showing the outer ring 2 and the holding device 56. FIG. 4 shows a state where the holding device 56 holds the flange 20 of the outer ring 2. The holding device 56 serves to support the flange 20 at three positions with circumferentially equal distance from outward in a radial direction to thereby hold the flange 20, and comprises two first holding parts 561 and 562 and a second holding part 563. In the flange 20 of the outer ring 2 in the manufacturing stage shown in FIGS. 3 and 4, a bolt hole 54 is not formed in any of the large-diameter flanges 501-504.

Each of the first holding parts 561 and 562 comprises an outer peripheral part 58 having a fan shape and side surface parts 60 extending radially-inwardly from circumferential both end parts of the fan-shape outer peripheral part 58. Because the fan-shape outer peripheral part 58 and the side surface parts 60 are provided, a recessed part 62 recessed toward an outer-diameter side and having a dimension capable of housing the large-diameter flanges 501-504 is formed in each of the first holding parts 561 and 562. The side surface parts 60 have a shape of an inner peripheral surface that can abut outer peripheral surfaces of the small-diameter flanges 521-523.

An inner peripheral surface of the second holding part 563 has a shape of an inner peripheral surface that can abut an outer peripheral surface of the small-diameter flange 524, however, does not possess the recessed part 62.

Circumferential widths (circumferential lengths) of the first and second holding parts 561-563 are equal to one another. Further, circumferential distances (angle θ5) of the first and second holding parts 561-563 with respect to the flange 20 are equally set to 120 degrees. The circumferential distances referred to in this specification (angle θ5) means that the circumferential distances between center positions of the respective first and second holding parts 561-563 in the circumferential width, are indicated in terms of angle.

The circumferential distances (angle θ5) between each of the first and second holding parts 561-563 are equal to one another so that the flange 20 can be supported by the first and second holding parts 561-563 with equal holding forces at the three points in order to do centering when the cylindrical main body 18 and the cylindrical fitting tolerance part 22 of the outer ring 2 are made turning.

A driving mechanism for driving the first and second holding parts 561-563 is not shown. The first and second holding parts 561-563 are located at a radially outward position of the flange 20 and then moved radially inward toward the outer peripheral surface of the flange 20 to thereby hold the outer peripheral surface of the flange 20.

In the example shown in FIG. 3, positions at which the first and second holding parts 561-563 hold the flange 20 are adjusted so that the recessed parts 62 and 62 of the first holding parts 561 and 562 are respectively provided crossing over the second and third large-diameter flanges 502 and 503 and the third holding part 563 is provided on the small-diameter flange 524. The small-diameter flange 524 is provided so as to be located between the large-diameter flange 504 and the large-diameter flange 504.

The holding positions are thus adjusted because the positions of the large-diameter flanges 501-504 are not spaced at circumferentially equal intervals, but are distant from one another by the angles θ1, θ2, θ3 and θ4 (θ1=θ3, θ2=θ4, θ1, θ3 ≠θ1, θ4) as described earlier. More specifically, the holding positions are thus adjusted because it is necessary to provide the first and second holding parts 561-563 so that the second and third large-diameter flanges 502 and 503 are respectively housed in the recessed parts 62 of the first holding parts 561 and 562, the large-diameter flange 501 is provided between the first holding part 561 and the second holding part 563, and the large-diameter flange 504 is provided between the second holding part 563 and the first holding part 562.

Because the first and second holding parts 561-563 are thus provided, the outer peripheral surface of the flange is held supporting at the three points by the inner peripheral surfaces of the first and second holding parts 561-563. At the time, the positions of the first and second holding parts 561-563 can be manually or automatically adjusted by an adjusting mechanism (not shown).

Figure 5:
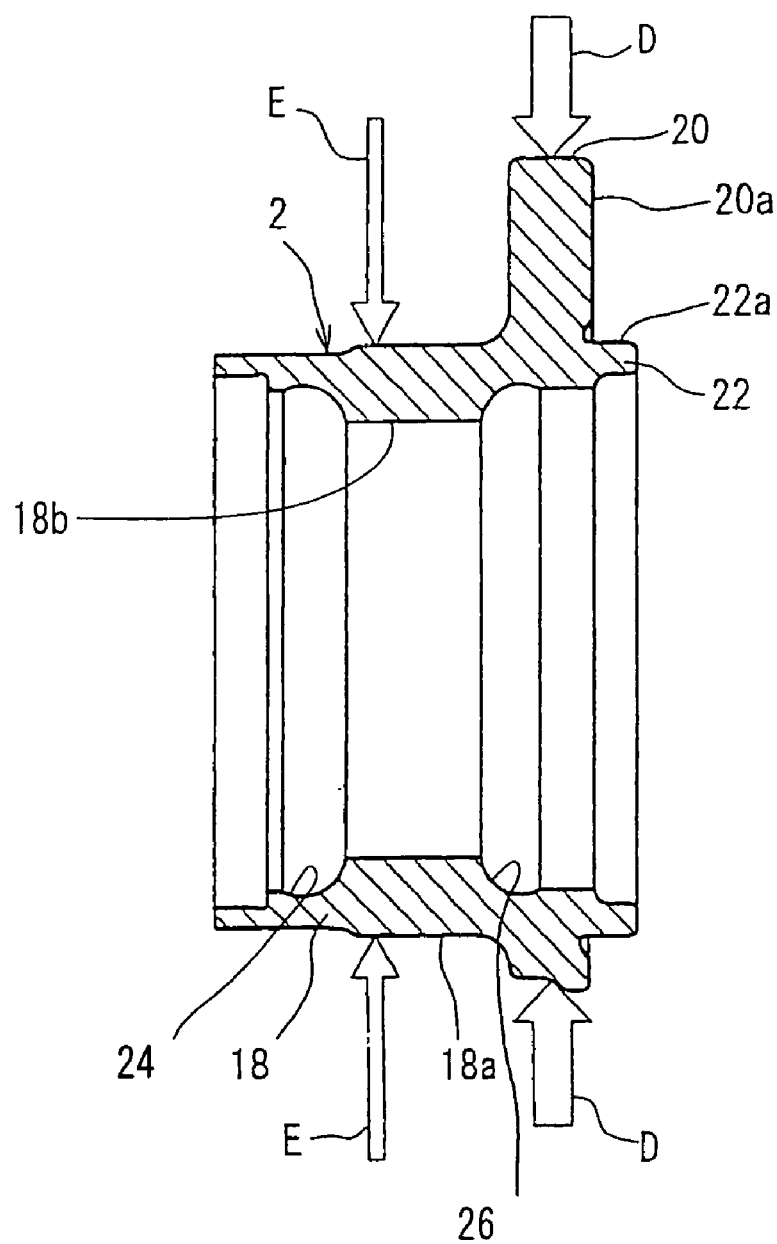
FIG. 5 is a side sectional view illustrating the outer ring in the outer ring manufacturing process.

Referring to FIG. 5, the turning to the outer ring 2 held by the holding device 56 is described. FIG. 5 is a sectional view of the outer ring 2 observed from the side surface thereof, wherein an arrow D shows the state where the holding device 56 holds the outer ring 2. The outer ring 2 is manufactured by means of hot forging.

The outer peripheral surface 18a of the cylindrical main body 18 of the outer ring 2 held by the holding device 56 as shown by the arrow D is made turning as shown by an arrow E. When the turning is completed, a heat treatment by means of induction hardening is applied to any necessary region including the inner peripheral surface 18b of the cylindrical main body 18 and the raceways 24 and 26 so that the raceways 24 and 26 of the outer ring 2 and the like, are hardened. The heat treatment by means of the induction hardening is capable of doing a local heat treatment, it is controlled to arbitrarily select a depth of a hardened layer and prevent a significant thermal impact with respect to any region other than the hardened layer.

Figure 6:
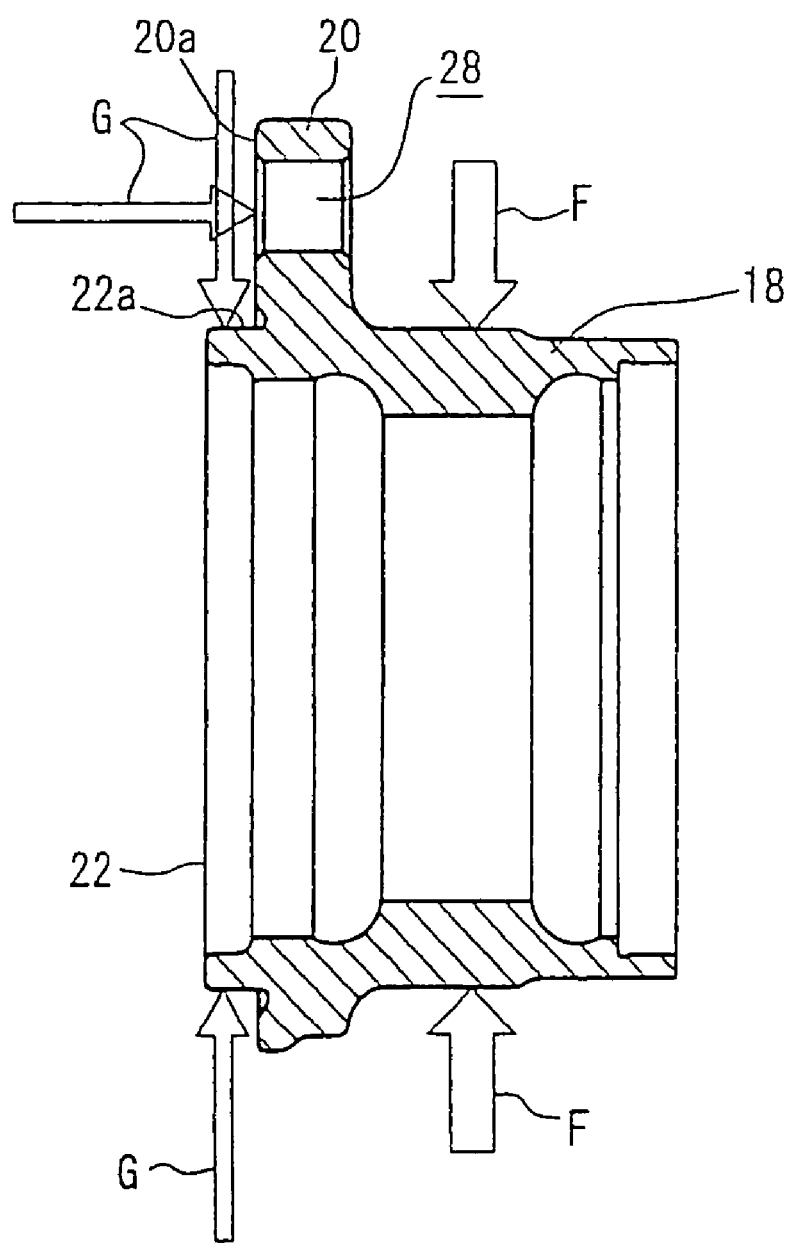
FIG. 6 is a side sectional view illustrating the outer ring in the outer ring manufacturing process.

As shown in FIG. 6, the bolt holes 28 are formed in the large-diameter flanges 501-504 after the heat treatment. After the formation of the bolt holes 28, the outer ring 2 is axially inverted, and the side surface on vehicle-inner-side 20a of the flange 20 and the outer peripheral surface 22a of the cylindrical fitting tolerance part 22 are made turning as shown by an arrow G with another holding device or the holding device 56, and finished so as to remove thermal strain and any distortion resulting from the formation of the bolt hole 54.

The outer ring 2 is thus manufactured including the foregoing process, the cylindrical main body 18 can be made turning even if the cylindrical fitting tolerance part 22 has too a short shape to be held. The shape of the cylindrical fitting tolerance part 22 that is too short to be held, means, for example, such a shape that the axial length of the cylindrical fitting tolerance part 22 is shorter than the axial holding length of the holding device 56 (more specifically, the axial lengths of the first and second holding parts 551-563). However, if the cylindrical fitting tolerance part 22 cannot be held by the holding device 56 irrespective of the comparison of the axial length thereof to the axial holding length of the holding device 56, the axial length of the cylindrical fitting tolerance part 22 then can be regarded as the shape having the too short length to be held.

Further, the step of turning of the side surface on vehicle-inner-side 20a of the flange 20 and the outer peripheral surface 22a of the cylindrical fitting tolerance part 22 before the heat treatment can be omitted. In consequence of the omission of the grinding step, only the step of turning to the outer peripheral surface 18a of the cylindrical main body 18 of the outer ring 2 is implemented before the heat treatment. A detailed description is given below.

In the bearing device for vehicle, the shape and size of the outer ring 2 may be different depending on a type of the vehicle in which the outer ring 2 is used, and, for example, the axial length of the cylindrical fitting tolerance part 22 constituting the outer ring 2 is very small. In other words, the flange 20 of the outer ring 2 may be very close to the vehicle inner side of the outer peripheral surface of the outer ring 2. In such a shape, there causes a case that it is unable to hold the cylindrical fitting tolerance part 22.

However, as the flange 20 and the cylindrical fitting tolerance part 22 are assembled to the knuckle, the side surface on vehicle-inner-side 20a of the flange 20 and the outer peripheral surface 22a of the cylindrical fitting tolerance part 22 require a predetermined surface precision.

In the method of manufacturing the bearing device for vehicle according to the present preferred embodiment, the turning step is implemented after the flange 20 is held in order to be able to respond to the bearing device for vehicle having such a shape. Therefore, the outer peripheral surface of the cylindrical main body 18 of the outer ring 2 can be reliably made turning even if the axial length of the cylindrical fitting tolerance part 22 is very small. Thereby, the side surface on vehicle-inner-side 20a of the flange 20 and the outer peripheral surface 22a of the cylindrical fitting tolerance part 22 can be made turning to be finished as shown by the arrow G referring to the outer peripheral surface of the cylindrical main body 18 after turning as a standard surface level in a state where the outer ring 2 is held as shown by an arrow F in FIG. 6. Accordingly, the required precision can be satisfactorily obtained even if the step of turning to the side surface on vehicle-inner-side 20a of the flange 20 and the outer peripheral surface 22a of the cylindrical fitting tolerance part 22 is omitted before the heat treatment. According to the reason described above, the turning before the heat treatment can be omitted in the method of manufacturing the bearing device for vehicle according to the present preferred embodiment.

The first and second holding parts 561-563 of the holding device 56 can be reliably supported at the three points as far as the circumferential distances (degree θ5) are circumferentially distant from one another by 120 degrees. Therefore, the circumferential lengths (widths) of the first and second holding parts 561-563 are not necessarily limited when the present invention is implemented.

Figure 7:
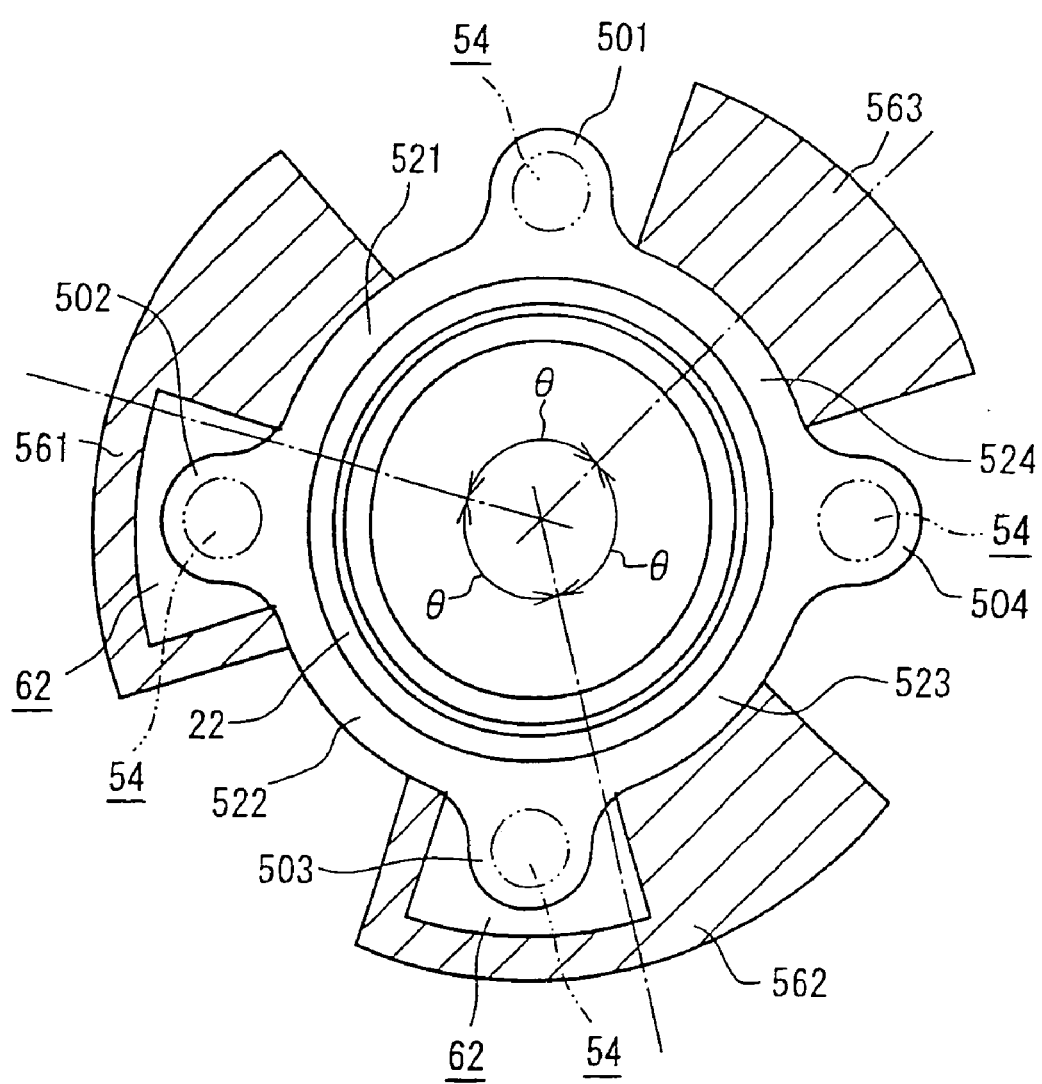
FIG. 7 is a front view illustrating the flange of the outer ring and the holding device in another outer ring manufacturing process.

FIG. 7 shows a structure where the circumferential lengths (widths) of the first and second holding parts 561-563 are different from those of the preferred embodiment described earlier. In the example shown in FIG. 7, the circumferential length of the second holding part 563 and the circumferential lengths of the first holding parts 561 and 562 are different. The large-diameter flanges 501-504 of the flange 20 of the outer ring 2 are formed at circumferentially equal intervals. The second holding part 563 abuts the outer peripheral surface of the small-diameter flange 524 (provided between the large-diameter flange 501 and the large-diameter flange 504). Each of the recessed parts 62 and 62 of the first holding parts 561 and 562 are formed at positions shifted from the center positions of the first holding parts 561 and 562 in the width direction (circumferential direction). The large-diameter flanges 502 and 503 are respectively housed in the recessed parts 62 and 62.

As is clear from the foregoing description, the holding device 56 according to the present invention is preferable to be constituted in such a manner that the circumferential widths (circumferential lengths) of the first and second holding parts 561-563 are set in accordance with the positions and the circumferential widths (circumferential lengths) of the large-diameter flanges 501-504, and the positions of the recessed parts 62 are set in accordance with the positions of the large-diameter flanges 501-504.

What is claimed is:

1. A method of manufacturing an outer ring member of a bearing device for a vehicle, the outer ring member having an axial first end toward a vehicle inner side, the outer ring member comprising:
   a cylindrical main body portion having a raceway along an inner peripheral surface thereof;
   a flange portion extending radially outward from an outer peripheral surface of the main body portion and toward said axial first end;
   a cylindrical fitting tolerance porton located axially further toward the axial first end than the flange portion,
   the method comprising:
   turning the cylindrical main body portion while holding a radially-outward peripheral surface of the flange portion with a holding device.

2. The manufacturing method of claim 1, wherein said flange holding comprises holding the flange portion at a plurality of positions at an outer peripheral surface of the flange, the plurality of positions being spaced to one another at circumferentially equal intervals while the flange portion is held.

3. The manufacturing method of claim 2,
   wherein the flange portion comprises in a circumferential direction a plurality of alternating large-diameter and small-diameter flange portions, each large-diameter flange portion having a bolt hole,
   wherein said flange holding comprises holding the flange portion with a plurality of holding parts, each one of the plurality of holding parts comprising a recessed part recessed toward an outer-diameter side and having a dimension capable of housing one of the large-diameter flange portions on an inner-periphery side.

4. The manufacturing method of claim 1 in which the bearing device comprises the outer ring member; an inner ring member having a portion concentrically inward of the outer ring member; a hub shaft having a portion concentrically inward of the inner ring member; a plurality of roller bodies between the inner ring member and outer ring member; and a plurality of retainers.

5. A method of manufacturing a bearing device for a vehicle, the bearing device having an outer ring with an axial first end toward a vehicle inner side, the outer ring comprising:
   a cylindrical main body having a raceway along an inner peripheral surface thereof;
   a flange at an outer peripheral surface of the outer ring and toward said axial first end;
   a cylindrical fitting tolerance located axially further toward the axial first end than the flange,
   the method comprising:
   turning the cylindrical main body while holding the flange with a holding device;
   heat-treating the cylindrical main body;
   after the heat-treating, turning to be finished a side surface of the flange on the vehicle-inner-side and an outer peripheral surface of the cylindrical fitting tolerance part.

6. The manufacturing method of claim 5,
   wherein the side surface on vehicle-inner-side and the outer peripheral surface of the cylindrical fitting tolerance part are made turning to be finished referring to the outer peripheral surface of the cylindrical main body after turning as a standard grinding level after the outer peripheral surface of the cylindrical main body is held in the turning step to be finished.

7. A method of manufacturing a bearing device for a vehicle, the bearing device having an outer ring with an axial first end toward a vehicle inner side, the outer ring comprising:
   a cylindrical main body having a raceway along an inner peripheral surface thereof;
   a flange at an outer peripheral surface of the outer ring and toward said axial first end;
   a cylindrical fitting tolerance located axially further toward the axial first end than the flange,
   the method comprising:
   turning the cylindrical main body while holding the flange with a holding device;
   heat-treating the cylindrical main body to harden said raceway;
   after the heat-treating, forming a hole in the flange;
   after the hole forming, turning a side surface of the flange on the vehicle-inner-side and an outer peripheral surface of the cylindrical fitting tolerance part to remove thermal strain and distortion which may have resulted from said hole forming.

8. The manufacturing method of claim 7, in which said flange holding comprises holding the flange at a plurality of positions at an outer peripheral surface of the flange, said plurality of positions being spaced to one another at circumferentially equal intervals while the flange is held.

9. The manufacturing method of claim 7,
   in which the flange comprises in a circumferential direction a plurality of alternating large-diameter and small-diameter flange portions, wherein said hole forming comprising forming a hole at each one of the large-diameter flange portions, wherein said flange holding comprises holding each one of the plurality of large-diameter flange portions with said holding device, the holding device including a plurality of holding parts, each one holding part comprising a recessed part recessed toward an outer-diameter side and having a dimension capable of housing one of the large-diameter flange portions on an inner-periphery side, and wherein said flange holding further comprises adjusting position of at least one of the plurality of holding parts.

* * * * *